June 30, 1925. 1,543,924
P. B. JAGGER ET AL
ROPE UNTWISTING MACHINERY
Filed Jan. 11, 1924 9 Sheets-Sheet 3
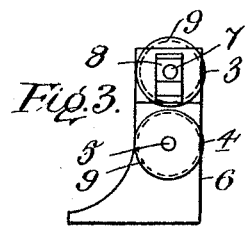
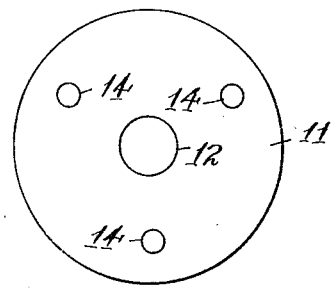
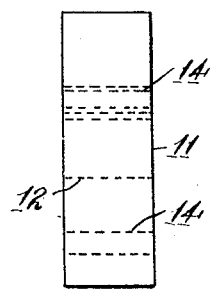
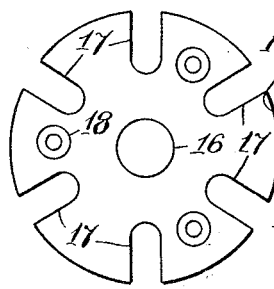
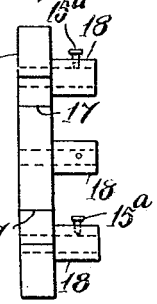
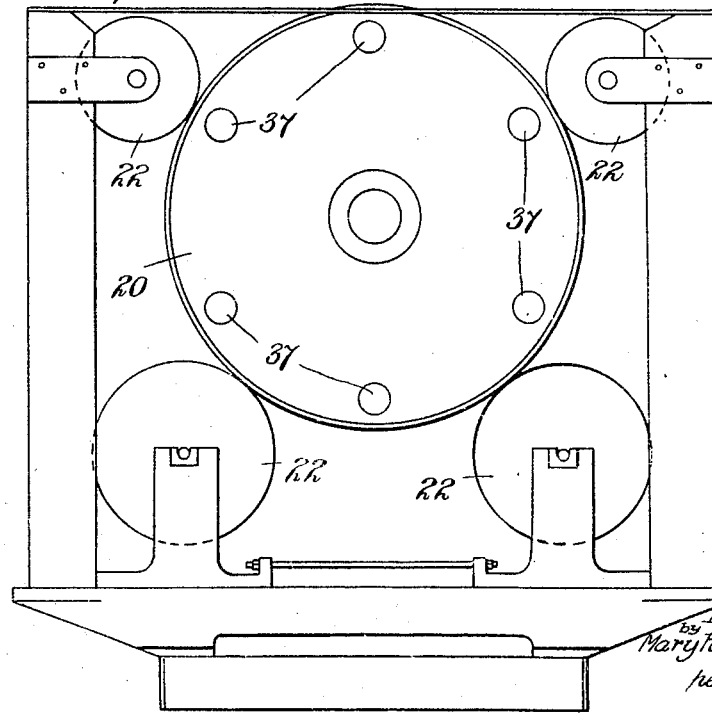

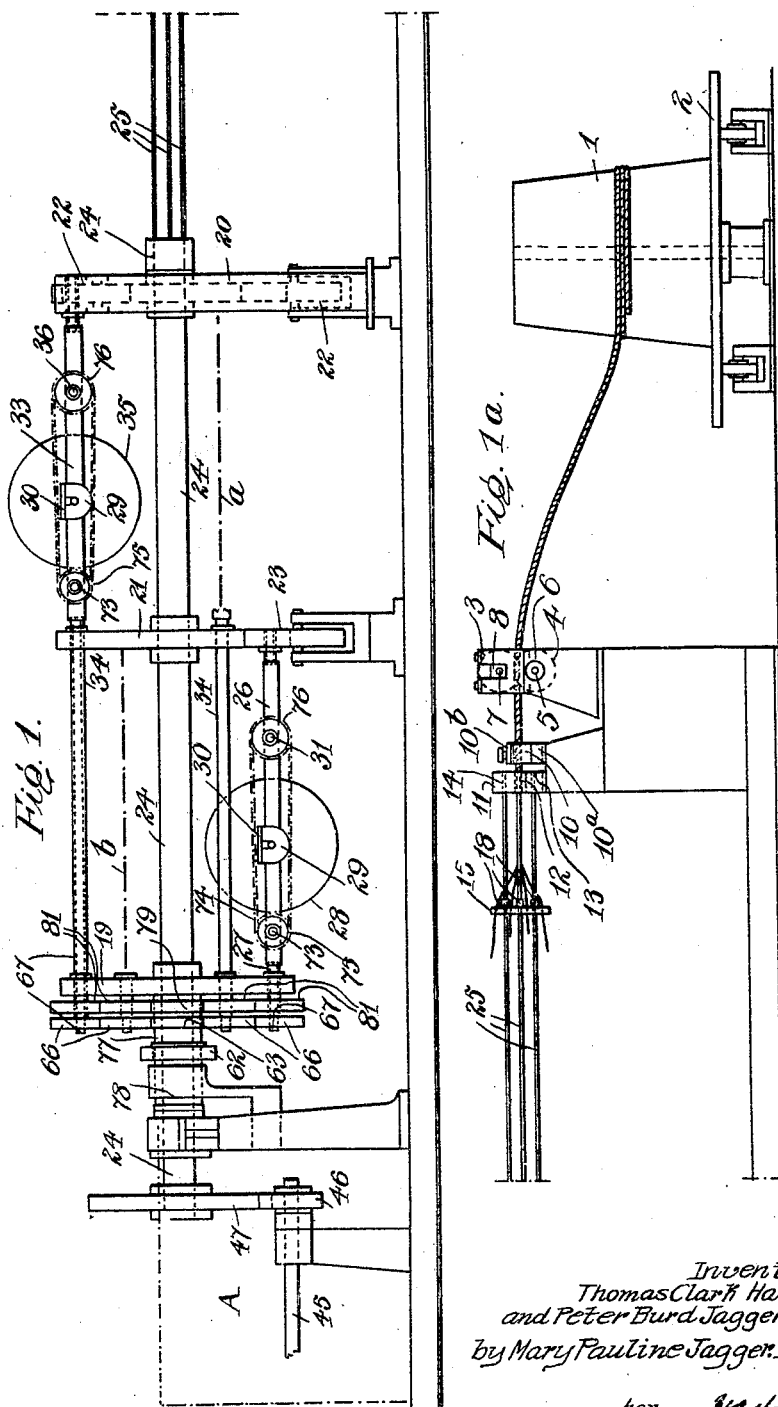

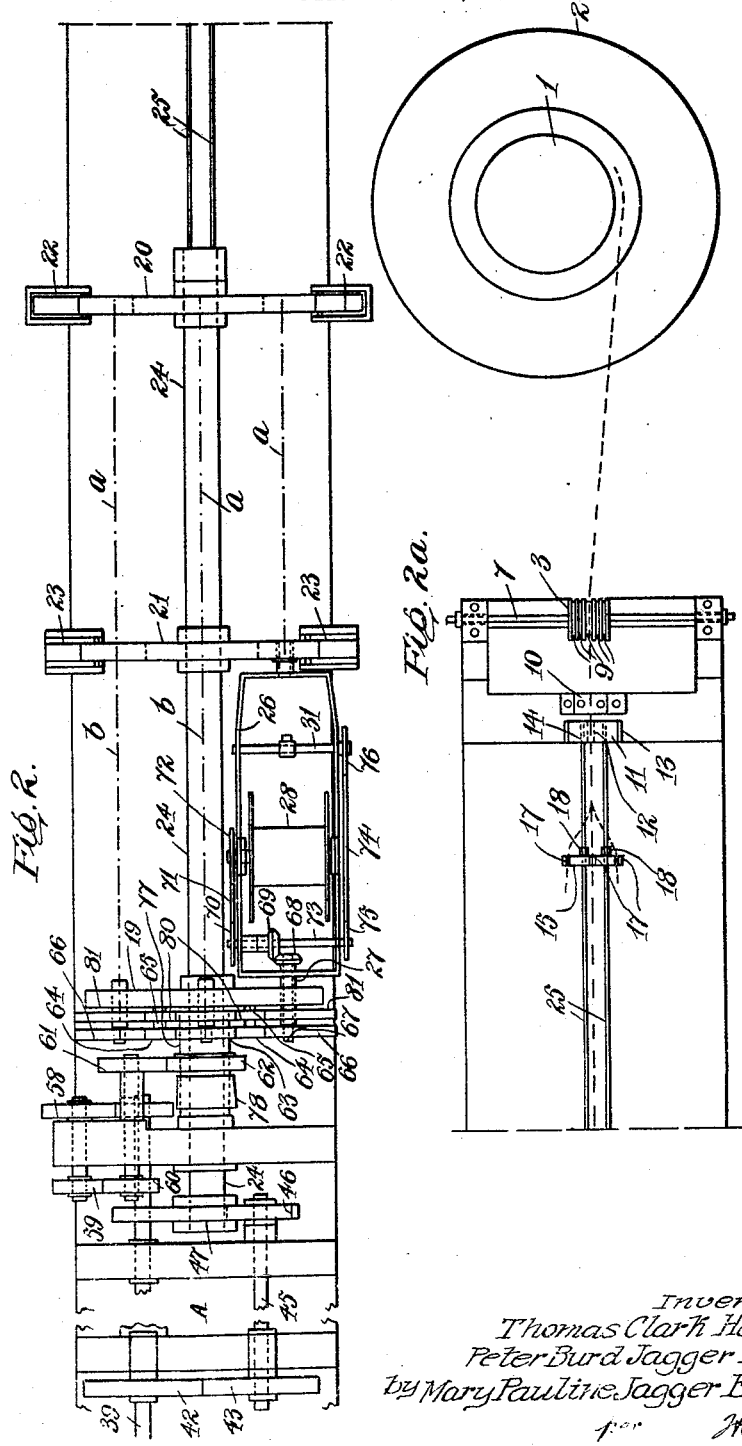

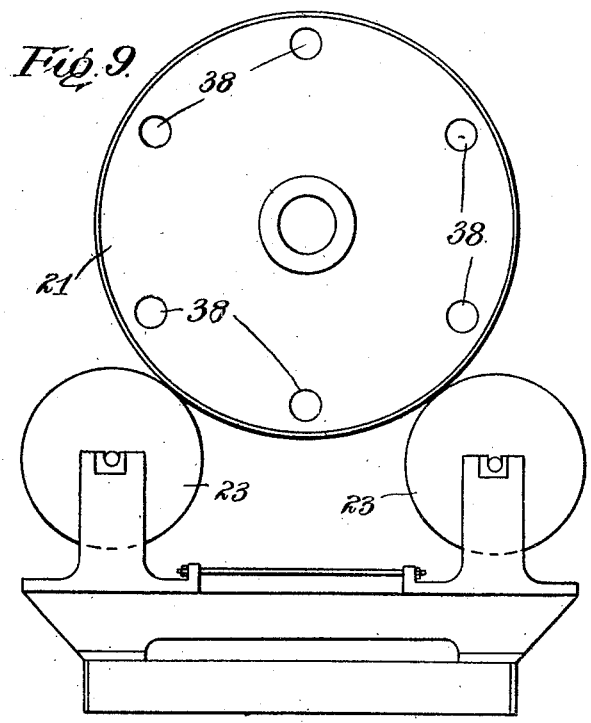
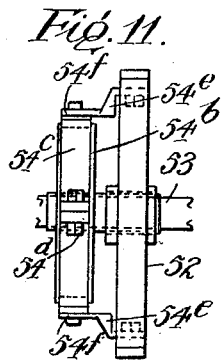
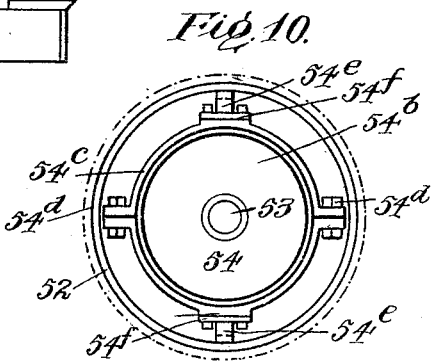
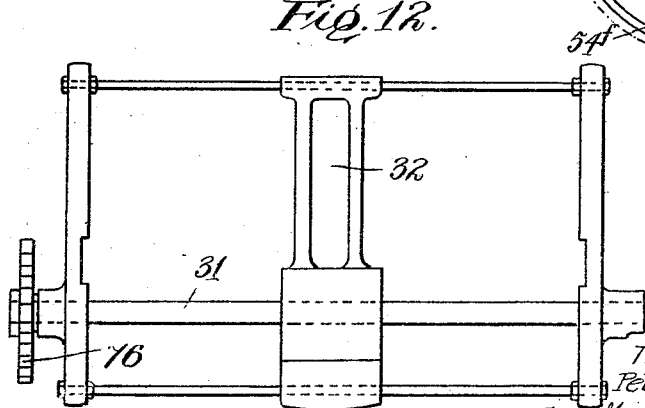

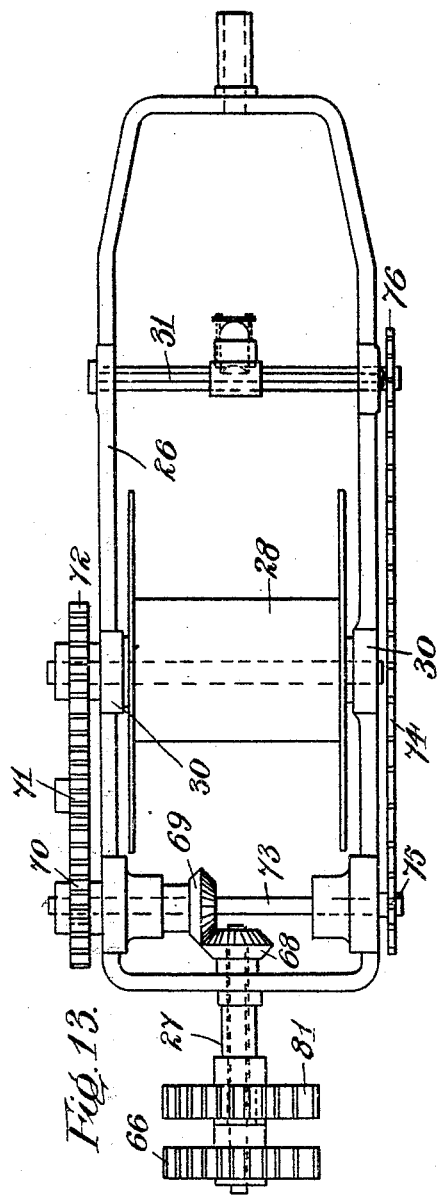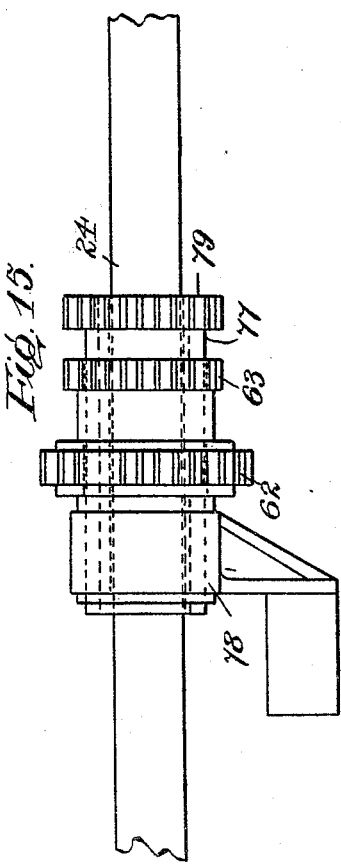

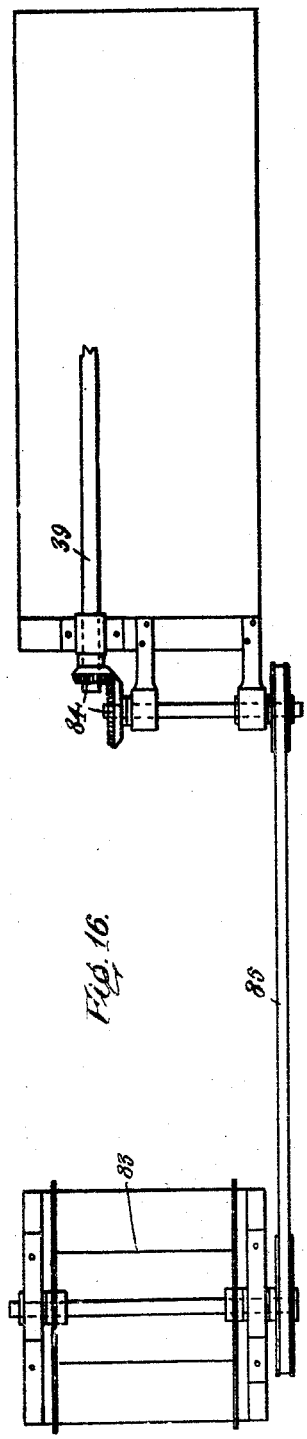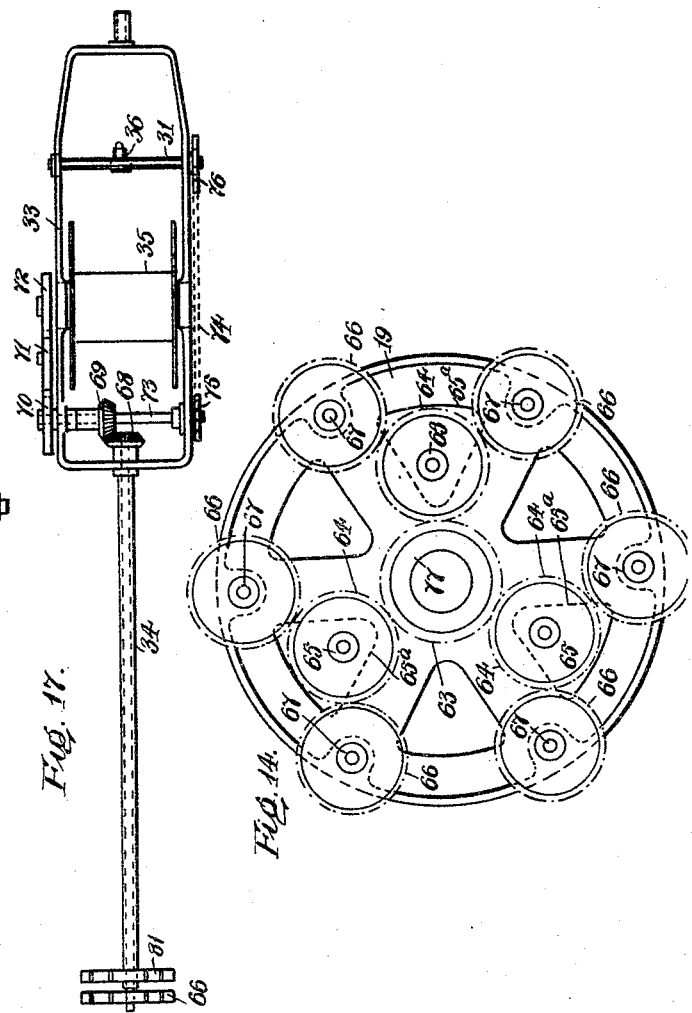

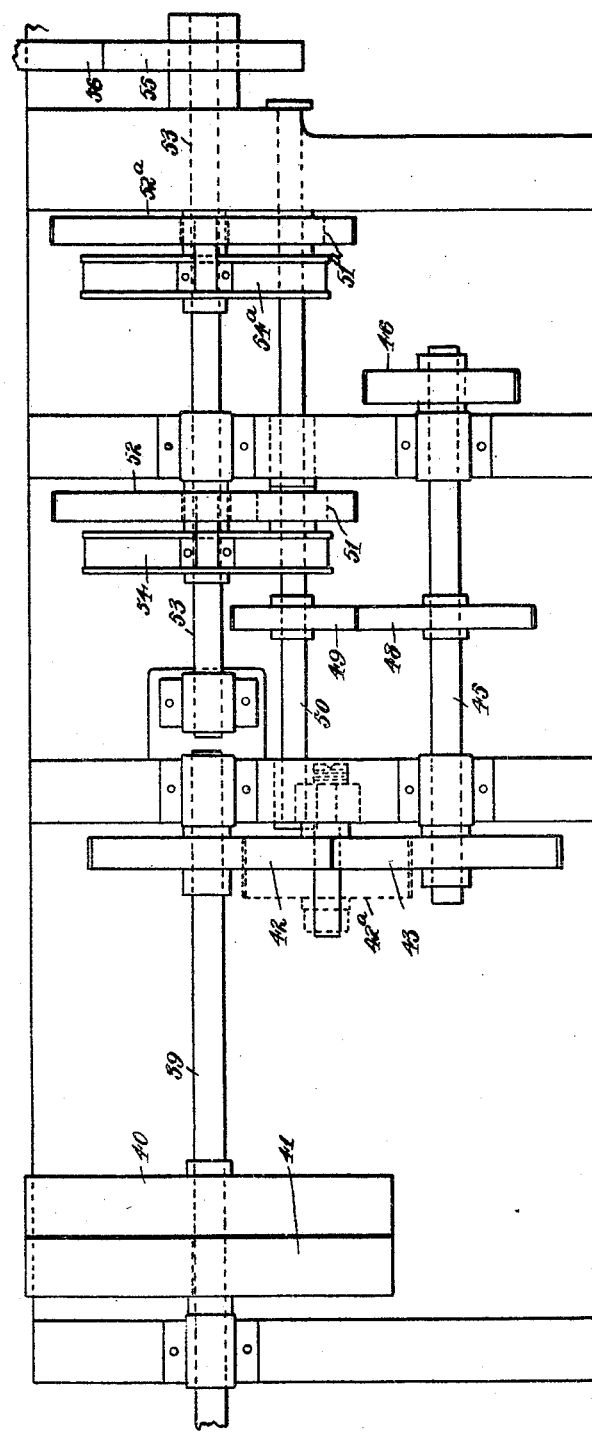

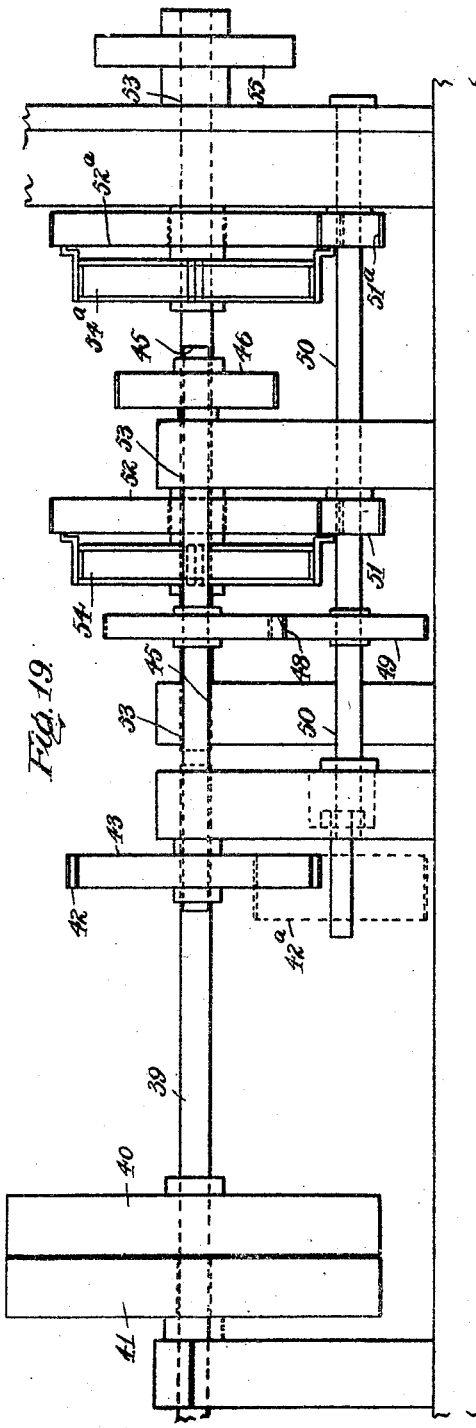

June 30, 1925. 1,543,924
P. B. JAGGER ET AL
ROPE UNTWISTING MACHINERY
Filed Jan. 11, 1924 9 Sheets-Sheet 9
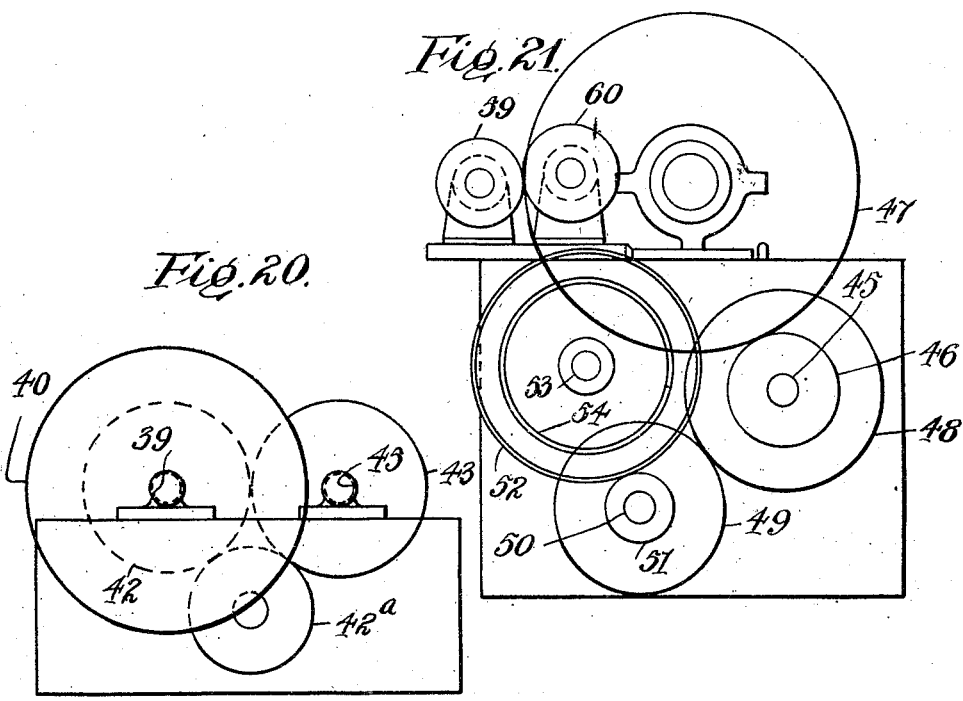
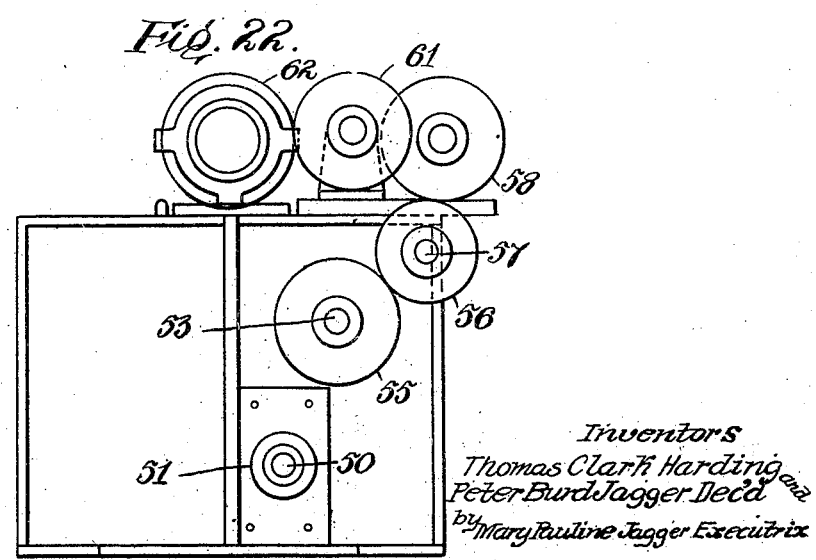
Inventors
Thomas Clark Harding
Peter Burd Jagger Dec'd
by Mary Pauline Jagger Executrix
per N.C.Nitt.
ATTORNEY.

Patented June 30, 1925.

1,543,924

UNITED STATES PATENT OFFICE.

PETER BURD JAGGER, DECEASED, LATE OF LONDON, ENGLAND; BY MARY PAULINE JAGGER, EXECUTRIX, OF LONDON, AND THOMAS CLARK HARDING, OF CLECKHEATON, ENGLAND; SAID HARDING ASSIGNOR TO MARY PAULINE JAGGER, OF LONDON, ENGLAND.

ROPE-UNTWISTING MACHINERY.

Application filed January 11, 1924. Serial No. 685,719.

*To all whom it may concern:*

Be it known that we, MARY PAULINE JAGGER, executrix of the late PETER BURD JAGGER, and THOMAS CLARK HARDING, subjects of the King of Great Britain, residing, respectively, at London, England, and Cleckheaton, Yorkshire, England, do declare that the said PETER BURD JAGGER and THOMAS CLARK HARDING did invent certain new and useful Improvements in and Relating to Rope-Untwisting Machinery, of which the following is a specification.

The present invention consists of an improved method of and machinery for mechanically untwisting and winding the separate strands of a rope (such as for example a wire rope, fibrous rope, and stranded electric cables) or the separate wires or yarns, or groups of wires or yarns, of a strand ready for further use or treatment.

Under the present invention, spools or bobbins, are so mounted, controlled, and connected for drive, that they rotate as a group round a common axis, and each, while moving bodily round that axis, is simultaneously rotated on its own axis, while preserving the horizontality of its own axis of rotation.

In doing this an important feature of the present invention consists in transmitting a drive of rotation to each spool or bobbin round its own axis, which drive of rotation is normally a positive gear drive from a main drive, but through a slipping component interposed between the main drive and the bobbins is automatically changed to a slipping drive, which allows the bobbins to slow down or even stop altogether, whenever and as often as and according as the resistance to winding grows more or less abnormal.

A further feature of importance of the present invention consists in transmitting a positive drive of revolution to the spools or bobbins through a wheel train which is independent of the wheel train for imparting drive of rotation to the spools or bobbins, except that both trains may be driven from a common main shaft.

The whole of the drive of the machine may be embodied in a gear head behind the back ring of the flier carrier.

By the present invention there is provided a practical machine for mechanically untwisting or unspooling the separate strands of a rope or like stranded cable which is noted (1) for an effective grouping and combination of mechanism so that it shall accomplish in a satisfactory manner the particular purpose for which it is designed and (2) the absence of complicated and ineffective drive mechanism.

Other features of this invention relate to the " leading-in " assemblage and to the rod system hereinafter described.

Having outlined the assemblage of mechanism, there is hereinafter described, by way of example, a complete machine embracing the essential features hereinbefore referred to.

The accompanying drawings illustrate a machine as made and tested by way of experiment with various forms of wire rope or cable, data as to a certain test being hereinafter given to shew the practical results obtained.

In the drawings;

Figs. 1 and 1$^a$ and 2 and 2$^a$ are respectively side elevation and plan views of a lay out of the machine, Fig. 3 is a view of the grip rolls. Figs. 4 and 5 are side and front views respectively of a revolving head, Figs. 6 and 7 are front and side views respectively of an opening plate, Fig. 8 is a front view of the front ring, Fig. 9 a front view of the middle ring, Figs. 10 and 11 are side and end views respectively of one form of slipping element. Fig. 12 is a view of the distributor, Fig. 13 is a plan view of one of the fliers for the back carrier, Fig. 14 is a view of the back carrier and epicyclic wheel trains, Fig. 15 a detail view shewing the sun wheels mountings, Fig. 16 a view of the core winding drum and drive therefor, Fig. 17 is a view of one of the fliers for the front carrier to a smaller scale than Fig. 13, Fig. 18 is a plan view of the gear head and Fig. 19 an elevation thereof, while Figs. 20, 21 and 22 are diagrammatic views of the drives for imparting drive of rotation to the spools and to the main rotating axis of the machine.

In the example of machine illustrated and now to be described in detail, the lay out can be divided into three parts, viz, the lead in assemblage, the spool or bobbin assemblage, and the drive assemblage. All these parts are carried by a framing or allied part thereto. By way of example let it be assumed that a six stranded wire rope is to be mechanically untwisted into separate strands, and the fibrous core or heart wound up by itself.

The rope or cable to be opened may be coiled on to a drum or wheel or revolving platform, which may be wheeled in front of the machine. As shewn the rope is coiled on a drum 1 mounted on a turntable 2. From the drum 1 the rope is led to the lead in assemblage.

The lead in assemblage comprises grip rolls, a clamp or die carriage, a revolving head, and an opening plate, the grip rolls being nearest to the drum 1.

The grip rolls 3 and 4 guide the rope into the machine. The shaft 5 of the roll is in a fixed bearing 6 while the shaft 7 of the roll 3 is in a movable bearing 8, this adjustable feature of the roll 3 allowing for pressure to be put on the rope as it passes between the rolls 3 and 4.

Each roll has a series of different width grooves or flutes 9 to suit varying diameter ropes.

From the grip rolls the rope passes to the clamp or die carriage 10, which is supported on the framework shortly in front of a revolving head. This clamp or die carriage 10 is for the purpose of assisting in steadying the rope, the rope being led therethrough, and consists in a fixed part 10ª bolted to the frame and a movable part 10ᵇ.

From the clamp or die carriage 10 the rope passes to the revolving head 11. This head 11 (Figs. 4 and 5) has a centre bore 12 for the passage of the rope. The head 11 is mounted in a hollow bearing 13 (Fig. 1) fixed to the framework. The head 11 is drilled so as to provide holes 14 for receiving the ends of a rod system hereinafter referred to.

Between the revolving head 11 and an opening plate 15, is the opening point at which the rope is unwound into separate strands, the opening plate 15 functioning to perform the opening operation.

The opening plate 15 is slidably mounted on a rod system 25 above referred to, so as to be capable of movement back and forth thereon, to accommodate the position of the plate 15 to different sized ropes and also variations in the pull during working of the machine.

The opening plate 15 (Figs. 6 and 7) has a central hole 16 and a number (six) of radial slots 17, through which slots 17 the strands of the rope pass.

The number of the radial slots 17 is according to the number of strands or wires in the rope or strand which is to be opened.

The central hole 16 in the opening plate 15 is to keep the fibrous core or heart of the rope clear of the wires or strands and free from danger of cutting thereby, the core being conducted longitudinally through the machine as hereinafter described.

The plate 15 has three bored face lugs 18, through which and the plate itself the members of the rod system 25 pass. The opening plate 15 when adjusted on the rod system may be fixed by set screws 15ª screwing into the upstanding lugs or bosses 18.

The main rotating axis or shaft 24 of the machine terminates shortly in front of a front ring or disc 20 of a double tandem carrier hereinafter referred to, but connected to rotate with this shaft 24 is the co-axial set of rods 25 previously referred to, which conveniently and advantageously may as shewn be a triangular system of rods, which at the end remote from the front ring or disc 20 of the flier carrier are connected at 14 to the revolving head 11 mounted in the hollow bearing 13.

In order to subject the strands or wires to the least possible stress during the untwisting at the opening point, the rotating rod system 25 projecting in front of the main rotating axis 24 of the machine is made long so that the slope angle of the strands or wires in opening is kept as small as possible, and the opening point forward of the opening plate 15 clear of any obstruction which would interfere with the freedom of the wires or strands in opening. The framelike nature of the rod system 25 gives the advantage of visibility of all the strands or wires when standing on either side of the machine.

From the opening plate 15 the separate strands now pass to the spools or bobbin assemblage.

To avoid undue centrifuging stress by revolving large masses of carriers of large diameter, the expedient is adopted of dividing the spools or bobbins with their fliers over a double tandem carrier, in each of which is mounted, by way of example, three fliers set triangularly, the setting of one being inverted with respect to the other so that in end on aspect the flier centres are equally spaced round a circle, and an evenly balanced geometrical structure is realized.

As shewn the double tandem carrier consists of a back ring 19, a front ring 20, and a medial ring 21, these being mounted on the main rotating shaft 24 to move therewith. The front ring (Fig. 8) is rotatably mounted in an external system of rollers 22, restraining the front ring from movement in any direction radial or axial, and the middle ring 21 is supported on a pair of rollers 23, (Fig. 9) the back ring 19 ordinarily not requiring any such mounting or support as adjacent thereto the main rotating axis or shaft 24 of the machine is mounted in a bearing supported in one of the back stands of the machine.

As stated there are three fliers in each carrier, the front carrier being that between the front ring 20 and the middle ring 21, and the back carrier being that between the middle ring 21 and the back ring 19. For clearness of illustration only one flier is shewn in each carrier, the Morse code lines a and b indicating the axis of the other fliers.

Each flier 26 (Fig. 13) of the back carrier is pivoted at its front (right hand) trunnion end in the middle ring 21. The trunnions ends are hollow to allow the passage of the wires or strands therethrough.

The rear hollow trunnion end of each flier 26 is extended to form a hollow shaft 27 which is mounted in the back ring 19 of the carrier.

Each flier 26 has a rotating spool or bobbin 28 the spindle of which is borne in open topped bearings 29, so that the spindle can be freely dropped into position and there secured by appropriate cover plates 30, thus facilitating the removal and replacement or exchange of the spools or bobbins 28.

In connection with each spool 28 is a reversing traverse screw or distributor 31 having a guide way 32 (Fig. 12) for spirally delivering the strands or wires to the spool.

The fliers 33 (Fig. 17) of the front carrier are pivoted at their front (right hand) trunnions ends in the front ring 20 and at their rear ends each trunnion is extended to form a hollow shaft 34 which hollow shaft is borne by the middle ring 21 and the back ring 19.

The front trunnion ends are formed hollow to allow the passage of the wires or strands to the spools or bobbins.

Each flier 33 has a rotating spool or bobbin 35 and a distributor 36 arranged in similar manner to those in connection with the spools or bobbins 28 of the rear fliers 26.

The front ring or disc 20 of the double tandem carrier has six holes 37 arranged round its margin, three for the reception of the front hollow trunnion ends of the fliers 33 and three for the passage of three of the strands or wires on their way to the hollow trunnion ends of the three fliers 26 of the back carrier.

The middle or disc 21 of the double tandem carrier has six holes 38 arranged round its margin, three for the reception of the hollow shafts 34 of the fliers 33, and three for the reception of the front trunnion ends of the rear fliers 26.

Dealing now with the drive assemblage, the form shown and now to be described has the advantage of increased power and positive action and moreover gives good facilities of speed change and easy attention for upkeep, keeping in good order, and adjustment.

Referring more particularly to Figs. 18, 19, 20, 21 and 22 a main driving shaft 39 with fast and loose pulleys 40, 41 driven by any suitable source of power is mounted in suitable bearings supported by the framing of the machine. From this shaft 39 independent wheel trains (located at A in Figs. 1 and 2) for imparting drive of rotation to the main rotating axis of the machine and for imparting drive of rotation to the spools or bobbins are arranged as follows:—

A pair of spur gears 42, 43, transmit motion to a counter shaft 45, on which is a pinion 46 which drives the main driving wheel 47 on the main rotating axis or shaft 24 of the machine.

From this counter shaft 45 a second pair of spur gears 48 and 49 drive a second counter or pinion shaft 50 on which is a pinion 51 which as shewn at $51^a$ may be duplicated. This pinion 51 drives a gear element 52, the connection of which to a third counter shaft 53 is made by means of an appropriate slipping element 54 which allows a slipping drive between 52 and 53 if the rate of take up of the spools or bobbins exceeds the rate of delivery of the strand or rope being opened. The gear element 52 is mounted to freely rotate on the counter shaft 53.

When the pinion 51 is duplicated, the duplicate pinion $51^a$ is associated with a companion gear $52^a$ similarly adapted to make connection with the third counter shaft 53 through a slipping element $54^a$. The duplicate slipping element $54^a$ may be kept idle as a stand by in case of an emergency, or both 54 and $54^a$ may be used together.

The particular form of slipping element shown in Figs. 10 and 11, comprises a disc $54^b$ fast on the shaft 53. The disc $54^b$ is surrounded by a strap $54^c$ consisting of a ring in halves, fitting into a groove in the disc $54^b$, and connected by bolts $54^d$. The tightness of fit of the strap $54^c$ on the disc $54^b$ is set by adjusting the bolts $54^d$, and this setting will normally impart a non-slip drive from the gear 52 to the shaft 53. Couplers consisting of angle pieces $54^e$ and plates $54^f$ bolted to the strap $54^c$ impart movement from the gear 52 to the strap $54^c$. This form of slipping element is known as a "friction" in wire or rope machine practice.

From this third counter shaft 53, through a gear 55 thereon, and an intermediate gear 56 on a stub shaft 57, one gear 58 of an abreast pair of gears moving as a unit is driven, from the other gear 59 of which, one gear 60 of a second abreast pair of gears moving as a unit is driven. From the other gear 61 of this second abreast pair of gears, the companion gear 62 to a rotating sunwheel 63 of the epicyclic wheel train for imparting rotatory movement to each of the spools or bobbins is driven.

Of the two abreast pairs of gears 58, 59 and 60, 61, one pair of the meshing gears (59, 60) is arranged to be exchanged for other pairs of different ratio, so as to accommodate different lays of rope. The different ratios will be determined by practical tests as in other machine shop practice.

The sunwheel 63 of the aforesaid epicyclic wheel train is rotatably mounted on a non-rotatable sleeve or bush 77 in which the main rotating shaft 24 rotates, the sleeve 77 being held fast by a bracket casting 78 bolted to the framework. The sunwheel 63 through intermediate gears 64, mounted on studs 65 carried by upstanding bosses 65ª on the back ring 19 of the double tandem carrier, drives gears 66 which are fast on the shafts 67 which pass through the hollow trunnion ends of shafts 27 of the fliers 26 of the spools or bobbins 28, each of these shafts 67 by a bevel gearing 68 and 69 driving a wheel train 70, 71 and 72 mounted on one side of the flier 26, and connected to the spool or bobbin 28 to impart drive of rotation thereto, the shaft 73 of the driven bevel 69 being also extended and employed in conjunction with a chain 74 and sprockets 75 and 76 mounted on the other side of the flier 26, to drive the reversing traverse screw or distributor 31.

In general for ordinary cases, the sunwheel 63, the intermediate wheels 65, and the wheels 66 driven by the intermediate wheels 64, may be of equal diameter.

For preserving the horizontality of the rotatory axis of the spools or bobbins 28 while moving bodily round the common axis 24 there is provided a like or similar epicyclic wheel train to that by which the rotatory movement is imparted to the spools or bobbins, but this second wheel train differs from the first in the particular that its sunwheel 79 is non-rotatably mounted or is fast on the sleeve 77.

The intermediate gears 80 of this second epicyclic wheel train are mounted on the same stub-shafts or studs 65 as those of the first train, but free for independent rotation thereon as they revolve round the fixed sunwheel 79. These intermediate gears 80 of the second epicyclic wheel train are of the same diameter as the fixed sunwheel 79 and drive equal sized gears 81 which are fast on the hollow trunnion ends or shafts 27 of the fliers 26 so that during the revolution of the fliers the displacement of these from the horizontal position is prevented by the rolling back of the gears connected thereto In arranging these two epicyclic wheel trains, that 79, 80 and 81 for preserving horizontality of the spools or bobbins is situated nearer to the back ring 19 of the flier carrier. The sunwheel 79 for the second epicyclic wheel train is as previously stated made fast with the non-rotatable sleeve 77, and the abreast pair of gears 62, 63 one gear 63 of which is the rotating sunwheel of the first epicyclic wheel train, is rotatably mounted on the bush or sleeve 77 so as to turn as a unit thereon.

As regards the control of the fliers 33 of the front portion of the tandem carrier, and the drive of the spools or bobbins 35 of such fliers 33, the rear trunnion ends of the front fliers as previously stated are extended to form hollow shafts 34 which shafts pass back through the middle and back rings 20 and 19 of the tandem carrier to receive their gear elements 81 of the second epicyclic wheel train, and the driving bevel shafts 67 are similarly extended in length to pass through and beyond the extended hollow shafts 34 to receive their gear elements 66 of the first epicyclic wheel train.

The transmission of the drive from the driving bevel-shaft 67 to the spools or bobbins 35 of the front fliers 33 and to their reversing traverse screws or distributors 36 is the same as that hereinbefore described with reference to the fliers 26 of the back carrier.

The main rotating shaft 24 of the machine is made hollow so that the core or heart of the rope may be conducted longitudinally through the machine to a winding reel or other storage device at the rear of the machine. That shewn is a reel 83, driven from the main shaft 39 by a bevel drive 84 and belt drive 85. The belt drive 85 allows for slip so as to accommodate any particular rate of delivery of the rope being opened.

The operation of the machine is as follows:—

Assuming a six stranded wire rope with a heart or core is to be unwound.

The rope is led from the drum 1 through the grip rolls 3, 4, clamp or die carriage 10, and revolving head 11. Between the revolving head 11 and the opening plate 15 the rope is unwound into separate strands. The heart or core is then led through the central hole 16 of the opening plate 15, through the hollow shaft 39 to the reel 83. The six strands are led through their appropriate radial slots 17 in the plate 15, and three of the strands (alternate ones being selected) are then led through the respective hollow trunnion ends of the fliers of the front carrier, to the respective spools or bobbins.

The other three strands are led through the three corresponding holes 37 of the front ring or disc 20, then through the respective hollow trunnion ends of the rear fliers to the spools or bobbins carried thereby.

The machine is now ready to commence running.

Drive of rotation from the driving shaft 39 to the main shaft of the machine 24, on which are fixed the back ring 19, the front ring 20, and the middle ring 21, is imparted by the gears 42, 43, counter shaft 45, pinion 46, and driving wheel 47. This rotation of the shaft 24 and rings 19, 20, and 21 revolves the fliers and the spools or bobbins therein around the shaft 24.

Drive of rotation from the driving shaft 39, to the spools or bobbins 28 and 35 is imparted by the gears 42, 43 counter shaft 45, gears 48 and 49, counter shaft 50, pinion 51 or/and 51ª, gear element 52 "friction" 54 or/and 54ª, counter shaft 53, gear 55, gear 56, stub shaft 57, abreast pair of gears, 58, 59, abreast of gears 60 and 61, companion gear 62, sunwheel 63, gears 64, gears 66, shafts 67, bevel gearings 68 and 69, shafts 73 and wheel trains 70, 71 and 72.

The distributors are driven from the shafts 73 by sprockets 75, chains 74 and sprockets 75.

For preserving the horizontality of the rotating axes of the spools 28 and 35, the non-rotatable sunwheel 79 co-operates with gears 80, and gears 81, on the hollow trunnion ends 27 and 34.

Drive of the wheel 83, is through bevel drive 84 and belt drive 85.

The provision of a slip component, such as the "friction" as is shewn by way of example of Figs. 10 and 11 allows the bobbins or spools to slow down or even stop so that the rotation of each bobbin accommodates itself to any variations in the rate of delivery of the strand being wound thereon, or in other words, the "friction" or slip drive, is first so as to give normally a non-slip positive drive from the main drive to the bobbins but any abnormal increase over the initial pull of the strands due to the rate of spool winding exceeding the rate of delivery, or from any other cause, results in a tightening up of the strand between the spool winding and the opening point and this increase in pull is transmitted as a braking effect on the disc component 54 of the "friction" so that through the strap connection the gear element is allowed to overrun until such time as the increase in pull is overcome and normal conditions restored.

In the example of machine described it is to be noted that the rate of rotation of the intermediate gear 64 is the sum of its rotation due to its revolution round the sun wheel 63 and of its rotation due to the rotation of the sunwheel. The rotation of the bobbin is not equal to the rotation of the intermediate gear, for the bevel gear 69 not only receives a rotation due to the bevel gear 68, which in turn is due to the intermediate gear 64, but also receives a rotation due to its rolling back on the gear 68 because the flier is maintained horizontal.

The following is the data of a trial test run on the machine under the supervision of one of the applicants.

A six stranded wire rope of 1¼" diameter and 10½" lay was taken, and 220 feet of the rope was unwound into separate strands and wound on the bobbins in 5¼ minutes.

Average speed of the main shaft is from 50 to 60 revolutions per minute while the normal or set speed of the bobbins depends on the length of lay, and is provided for by determining the ratio of the change speed wheels 59 and 60.

It may be observed that a "laid" rope consists of a heart around which are twisted six strands, each containing a similar heart, usually covered by six wires. A "cable laid" rope is composed of six "laid" ropes closed together to form one cable.

A "formed" rope comprises six strands laid round a heart, each strand consisting of eighteen wires in addition to the core. A wire rope "strand" generally contains from six to nine wires and never more than eighteen.

From this it will be noted that a generally useful machine is one containing six spools or bobbins, but there are cases in which a machine containing more spools or bobbins may be required.

In general, for ordinary purposes, the wheel train for imparting drive of rotation to the spools, or bobbins consists of a spur wheel mounted on the driven bevel shaft, this spur wheel driving another spur wheel on the spool or bobbin through an intermediate gear. It will thus be seen that by disconnecting this wheel train, such as by removing the intermediate gear and running the machine in the reverse direction, the closing of wires of strands to form a rope is possible. A use of the machine thus becomes possible by which, if a fault develops in an expensive rope which would cause it to be condemned if not remedied, this faulty rope can be opened back to the fault, the fault remedied, and the rope again closed.

For running the machine in a reverse direction the wheel 42 is shifted to the left clear of the wheel 43, and a double wheel 42ª mounted on a stud 42ᵇ, the drive then being from 42 to 42ª and from this to 43.

The machine is useful for unwinding stranded electric cables such as telephones and telegraph cables for reconditioning, also for unwinding fibrous ropes such as hemp ropes either for re-making or as a step in paper making.

It will be readily understood that although we have spoken throughout of keeping the bobbins "horizontal" the devices described are equally adapted to maintain them parallel to any plane, which itself is parallel to the main axis of rotation, and when in the specification or claims we use the word "horizontal" we extend it to include such other cases of parallelism.

What we claim is:—

1. For the purpose of mechanically untwisting and reeling the strands of a rope or the like, or the separate wires or yarns of a strand, or groups of wires or yarns of a strand, a machine comprising spools mounted so as to revolve on a common axis, gripping devices for said rope, means for untwisting said rope, a main drive, a drive for revolving said spools, a drive normally acting as a positive gear drive for rotating said spools on their own axes, a slipping component interposed in said drive of rotation, which said slipping component allows the bobbins to slow down or even stop altogether, whenever and as often as and according as the resistance to winding grows abnormal, and means for preserving horizontality of said spools.

2. For the purpose of mechanically untwisting and reeling the strands of a rope or the like, or the separate wires or yarns of a strand, or groups of wires or yarns of a strand, a machine comprising spools mounted so as to revolve on a common axis, gripping devices for said rope, means for untwisting said rope, a main drive, a drive for revolving said spools, a drive normally acting as a positive gear drive for rotating said spools on their own axes, a wheel train as a unit in said drive of rotation, a slipping component interposed in said drive of rotation, which said slipping component allows the bobbins to slow down or even stop altogether, whenever and as often as and according as the resistance to winding grows more or less abnormal, and means for preserving horizontality of said spools.

3. Machine of the class described, comprising spools mounted in fliers so as to revolve on a common axis, carriers for said fliers, gripping devices for said rope, means for untwisting said rope, a main drive, a drive for revolving said spools, a drive normally acting as a positive gear, drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said revolving axis of the spools.

4. Machine of the class described, comprising spools mounted in fliers so as to revolve on a common axis, carriers for said fliers, gripping devices for said rope, means for untwisting said rope, a main drive, a drive for revolving said spools, a drive normally acting as a positive gear drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said revolving axis of the spools, and a gear head in which the whole of the drive of the machine is carried.

5. Machine of the class described, comprising spools mounted in fliers having hollow trunnion ends and arranged to revolve on a common axis, carriers for said fliers, gripping devices for said rope, means for untwisting said rope, a main drive, a drive for revolving said spools, a drive normally acting as a positive gear drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said axis of the spools, and a shaft passing through the hollow trunnion ends of said fliers, a gear at one end of said shaft, said gear forming a member of the first epicyclic wheel train, and a bevel gearing at the other end of said shaft for imparting drive of rotation to the spools.

6. Machine of the class described, comprising spools mounted in fliers having hollow trunnion ends and arranged to revolve on a common axis, carriers for said fliers, gripping devices for said rope, means for untwisting said rope, a main drive, a drive for revolving said spools, a drive normally acting as a positive gear drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said axis of the spools, and a shaft passing through the hollow trunnion ends of said fliers, a gear at one end of said shaft, said gear forming a member of the first epicyclic wheel train, a bevel bearing at the other end of said shaft, and a wheel train as a final gear to the spool.

7. Machine of the class described, comprising spools mounted in fliers having hollow trunnion ends and arranged to revolve on a common axis, carriers for said fliers, gripping devices for said rope, means for untwisting said rope, a main drive, a drive for revolving said spools, a drive normally acting as a positive gear drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said axis of the spools and a shaft passing through the hollow trunnion ends of said fliers, a gear at one end of said shaft, said gear forming a member of the first epicyclic wheel train, and a bevel gearing at the other end of said shaft for transmitting drive of rotation to the spool, the outer gears of said second epicyclic wheel train being fast on the hollow trunnion ends of the fliers.

8. Machine of the class described, comprising spools mounted in fliers so as to revolve on a common axis, carriers for said fliers, gripping devices for said rope, means for untwisting said rope, a main drive, a drive for revolving said spools, a drive normally acting as a positive gear drive for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said axis of the spools, the intermediate gears of both epicyclic wheel trains being mounted on the same shafts.

9. Machine of the class described, comprising spools mounted in fliers so as to revolve on a common axis, carriers for said fliers, gripping devices for said rope, means for unwinding said rope, a main drive, a drive normally acting as a positive gear for rotating said spools on their own axes, a slipping component interposed in said drive of rotation, an epicyclic wheel train as a unit in said drive of rotation, an epicyclic wheel train for preserving the horizontality of the rotatory axes of said spools, the sunwheel of the first epicyclic train being rotatably mounted on the revolving axis of said spools, and the sunwheel of the second epicyclic train being non-rotatably mounted on said revolving axis of the spools, the epicyclic wheel train for preserving horizontality of the spools being situated next to the back ring of the flier carrier.

10. Machine of the class described comprising fliers, spools mounted therein, means for preserving horizontality of the spools, gripping devices for the rope, means for untwisting said rope, a main driving shaft, a main drive, means for imparting a drive of rotation to the fliers round a common axis, means for imparting a drive of rotation to the spools on their own axes comprising a wheel train gear and an interposed slipping element therein.

11. Machine of the class described comprising fliers, spools mounted therein, means for preserving horizontality of the spools, gripping devices for the rope, means for untwisting said rope, a main driving shaft, a main drive, means for imparting a drive of rotation to the fliers round a common axis, means for imparting a drive of rotation to the spools on their own axes comprising a wheel train gear, an interposed slipping element therein, and change wheels in said wheel train gear.

12. Machine of the class described, comprising fliers, spools mounted therein, a common main shaft round which the fliers revolve, gripping devices for the rope, means for untwisting said rope, a main driving shaft, a wheel train for imparting a drive of rotation to said common main shaft, a wheel train for imparting a drive of rotation to said spools on their own axes, said last mentioned drive having a slipping element and an epicyclic wheel train as units therein, and means for preserving horizontality of the spools.

13. Machine of the class described, comprising fliers, spools mounted therein, a common main shaft round which the fliers revolve, gripping devices for the rope, means for untwisting said rope, a main driving shaft, a wheel train for imparting a drive of rotation to said common main shaft, a wheel train for imparting a drive of rotation to said spools on their own axes, said last mentioned drive having a slipping element and an epicyclic wheel train as units therein, and an epicyclic wheel train for preserving horizontality of the spools.

14. Machine of the class described, comprising fliers, spools mounted therein, a common main shaft round which the fliers revolve, gripping devices for the rope, means for untwisting said rope, a main driving shaft, a wheel train for imparting a drive of rotation to said common main shaft, a wheel train for imparting a drive of rotation to said spools on their own axes, said last mentioned drive having a slipping element and an epicyclic wheel train as units therein, and an epicyclic wheel train for preserving horizontality of the spools, the sun wheels of the said epicyclic wheel trains being mounted on the revolving axis of said spools, one sun wheel being rotatably mounted and the other non-rotatably mounted thereon.

15. Machine of the class described, comprising fliers, spools mounted therein, a common main shaft round which the fliers revolve, gripping devices for the rope, an opening plate for said rope, a main driving shaft, a wheel train for imparting a drive of rotation to said common main shaft, a wheel train for imparting a drive of rotation to said spools on their own axes, said last mentioned drive having a slipping element in the form of a "friction" and an epicyclic wheel train as units therein, and means for preserving horizontality of the spools.

16. Machine of the class described, comprising a double tandem carrier, fliers therein, spools mounted in said fliers, a common main shaft round which the fliers revolve, gripping devices for the rope, means for untwisting said rope, a main driving shaft, a wheel tran for imparting a drive of rotation to said common main shaft, a wheel train for imparting a drive of rotation to said spools on their own axes, said last mentioned drive having a slipping element and an epicyclic wheel train as units therein, change wheels, and an epicyclic wheel train for preserving horizontality of the spools.

17. Machine of the class described, comprising a double tandem carrier, tracks therefor, fliers in said carrier, spools mounted in said fliers, a common main shaft round which the fliers revolve, a rod system, gripping devices for the rope, means for untwisting said rope, a main driving shaft, a wheel train for imparting a drive of rotation to said common main shaft, a wheel train for imparting drive of rotation to said spools on their own axes, said last mentioned drive having a slipping element and an epicyclic wheel train as units therein, and an epicyclic wheel train for preserving horizontality of the spools.

18. Machine of the class described, comprising a double tandem carrier, tracks therefor, fliers in said carrier, spools mounted in said fliers, a common main shaft round which the fliers revolve, grip rolls, a die carriage, a rod system extending forward of said main shaft, an opening plate on said rod system, a main driving shaft, a wheel train for imparting a drive of rotation to said common main shaft, a wheel train for imparting a drive of rotation to said spools on their own axes, said last mentioned drive having a slipping element and an epicyclic wheel train as units therein, and an epicyclic wheel train for preserving horizontality of the spools.

19. Machine of the class described, comprising a double tandem carrier, tracks therefor, fliers in said carrier, spools mounted in said fliers, a common main shaft round which the fliers revolve, grip rolls, a die carriage, a rod system extending forward of said main shaft, an opening plate on said rod system, a main driving shaft, a wheel train for imparting a drive of rotation to said common main shaft, a wheel train for imparting a drive of rotation to said spools on their own axes, said last mentioned drive having a slipping element and an epicyclic wheel train as units therein, an epicyclic wheel train for preserving horizontality of the spools, a storage device for the heart or core of the rope, and means for conducting said core to said storage device.

20. Machine of the class described, comprising a double tandem carrier, tracks therefor, fliers in said carrier, spools mounted in said fliers, a common main shaft round which the fliers revolve, grip rolls, a die carriage, a rod system extending forward of said main shaft, an opening plate on said rod system, a main driving shaft, a wheel train for imparting a drive of rotation to said common main shaft, a wheel train for imparting a drive of rotation to said spools on their own axes, said last mentioned drive having a slipping element and an epicyclic wheel train as units therein, an epicyclic wheel train for preserving horizontality of the spools, and means for accommodating any particular rate of delivery of the rope being opened.

In testimony whereof, we affix our signatures.

MARY PAULINE JAGGER,
*Executrix of Peter Burd Jagger, deceased.*
THOMAS CLARK HARDING.